(12) United States Patent
Cho et al.

(10) Patent No.: US 10,840,019 B2
(45) Date of Patent: Nov. 17, 2020

(54) ELECTRONIC COMPONENT

(71) Applicant: SAMSUNG ELECTRO-MECHANICS CO., LTD., Suwon-si (KR)

(72) Inventors: Beom Joon Cho, Suwon-si (KR); Woo Chul Shin, Suwon-si (KR); Ki Young Kim, Suwon-si (KR); Sang Soo Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 27 days.

(21) Appl. No.: 16/210,653

(22) Filed: Dec. 5, 2018

(65) Prior Publication Data

US 2020/0126725 A1    Apr. 23, 2020

(30) Foreign Application Priority Data

Oct. 17, 2018    (KR) .................. 10-2018-0123562

(51) Int. Cl.
*H01G 4/224* (2006.01)
*H01G 4/248* (2006.01)
(Continued)

(52) U.S. Cl.
CPC .......... *H01G 4/224* (2013.01); *H01G 4/2325* (2013.01); *H01G 4/248* (2013.01); *H01G 4/30* (2013.01);
(Continued)

(58) Field of Classification Search
CPC .......... H01G 4/224; H01G 4/248; H01G 4/30; H01G 4/38; H01G 4/012; H01G 4/1227;
(Continued)

(56) References Cited

U.S. PATENT DOCUMENTS

2003/0161089 A1    8/2003  Togashi
2008/0239621 A1    10/2008 Tajuddin et al.
(Continued)

FOREIGN PATENT DOCUMENTS

JP       2003-257784 A    9/2003
JP         6160093 B2     7/2017
KR    10-2016-0089819 A   7/2016

OTHER PUBLICATIONS

Korean Office Action dated Sep. 20, 2019 issued in Korean Patent Application No. 10-2018-0123562 (with English translation).

*Primary Examiner* — Michael P McFadden
(74) *Attorney, Agent, or Firm* — Morgan, Lewis & Bockius LLP

(57) ABSTRACT

An electronic component includes a body, external electrodes including head portions disposed on external surfaces of the body, and band portions extending from the head portions to top and bottom surfaces and both side surfaces of the body, respectively, each of the band portions including an extending portion disposed on at least one surface of the body extending beyond a band portion disposed on another surface of the body, and metal frames electrically connected to the pair of external electrodes, respectively. The metal frames includes support portions bonded to the head portions, mounting portions extending from ends of the support portions in a first direction and spaced apart from the body and the external electrodes, and bonding portions extending from the support portions to be bonded to the extending portions.

16 Claims, 7 Drawing Sheets

(51) Int. Cl.
*H01G 4/30* (2006.01)
*H01G 4/232* (2006.01)
*H01G 4/12* (2006.01)
*H01G 4/012* (2006.01)
*H01G 4/008* (2006.01)

(52) U.S. Cl.
CPC ............. *H01G 4/008* (2013.01); *H01G 4/012* (2013.01); *H01G 4/1227* (2013.01); *H01G 4/1245* (2013.01)

(58) Field of Classification Search
CPC .... H01G 4/1245; H01G 4/065; H01G 4/0085; H01G 4/40; H01G 4/12; H01G 4/2325; H01G 4/008; H05K 1/0231
See application file for complete search history.

(56) References Cited

U.S. PATENT DOCUMENTS

| | | | |
|---|---|---|---|
| 2016/0086734 A1* | 3/2016 | Park | H01G 4/30 174/260 |
| 2016/0211074 A1* | 7/2016 | Gu | H01G 4/012 |

* cited by examiner

ELECTRONIC COMPONENT

CROSS-REFERENCE TO RELATED APPLICATION(S)

This application claims the benefit of priority to Korean Patent Application No. 10-2018-0123562 filed on Oct. 17, 2018 in the Korean Intellectual Property Office, the disclosure of which is incorporated herein by reference in its entirety.

TECHNICAL FIELD

The present disclosure relates to an electronic component.

BACKGROUND

Multilayer capacitors have been used in various electronic devices due to advantages thereof such as compactness and high capacitance.

Recently, due to the rapid rise in popularity of eco-friendly vehicles and electric vehicles, power driving systems in vehicles have increased, increasing the demand for multilayer capacitors which are required in such vehicles.

In order to be used as a component for a vehicle, a multilayer capacitor should have a high level of thermal resistance or electrical reliability, gradually increasing the required level of performance of the multilayer capacitor.

Therefore, there has been increased demand for a structure of a multilayer capacitor having improved durability against vibrations or deformation.

To improve such durability against vibrations or deformation, an electronic component may have a structure in which a multilayer capacitor is mounted at a predetermined distance from a board using a metal frame.

However, in the electronic component according to the related art, a bonding portion of an external electrode of the multilayer capacitor and a metal frame may be deteriorated by heat and mechanical impacts when the board is mounted. Thus, the multilayer capacitor may be separated from the metal frame.

To address the above disadvantage, a structure, in which a portion of a metal frame is bent to cover and hold the multilayer capacitor such that bonding strength is improved, is disclosed.

However, a pressure may be applied to the multilayer capacitor while the portion of the metal frame is bent. Thus, the multilayer capacitor may be damaged or cracking may occur in the multilayer capacitor.

Moreover, even if the multilayer capacitor is inserted and bonded after the portion of the metal frame is bent in advance, a surface of the multilayer capacitor may be scratched to physically degrade reliability.

SUMMARY

An aspect of the present disclosure may provide an electronic component having improved bonding strength between a multilayer capacitor and a metal frame while significantly reducing an effect of impacts applied to the multilayer capacitor.

According to an aspect of the present disclosure, an electronic component includes a body, first and second external electrodes including first and second head portions disposed on both end surfaces of the body and first and second band portions extending from the first and second head portions to portions of top and bottom surfaces and both the side surfaces of the body, respectively, the first and second band portions being disposed in such a manner that a band portion section disposed on at least one surface of the body has an area larger than an area of a band portion section disposed on another surface of the body, and first and second metal frames connected to the first and second external electrodes, respectively. The first and second metal frames respectively include first and second support portions bonded to the first and second head portions, respectively, first and second mounting portions extending from lower ends of the first and second support portions in a first direction, respectively, and spaced apart from the first and second external electrodes, respectively, and first and second bonding portions extending from the first and second support portions toward a surface on which a portion of the first and second band portions is disposed to have a large area.

According to another aspect of the present disclosure, an electronic component includes a body, a pair of external electrodes including head portions disposed on both surfaces of the body, respectively, and band portions extending from the head portions to top and bottom surfaces and both side surfaces of the body, respectively, each of the band portions including an extending portion disposed on at least one surface of the body to be relatively long, and a pair of metal frames connected to the pair of external electrodes, respectively. The pair of metal frames include support portions bonded to the head portions, mounting portions extending from lower ends of the support portions in a first direction and spaced apart from the body and the external electrodes, and bonding portions extending from the support portions to be bonded to the extending portions.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
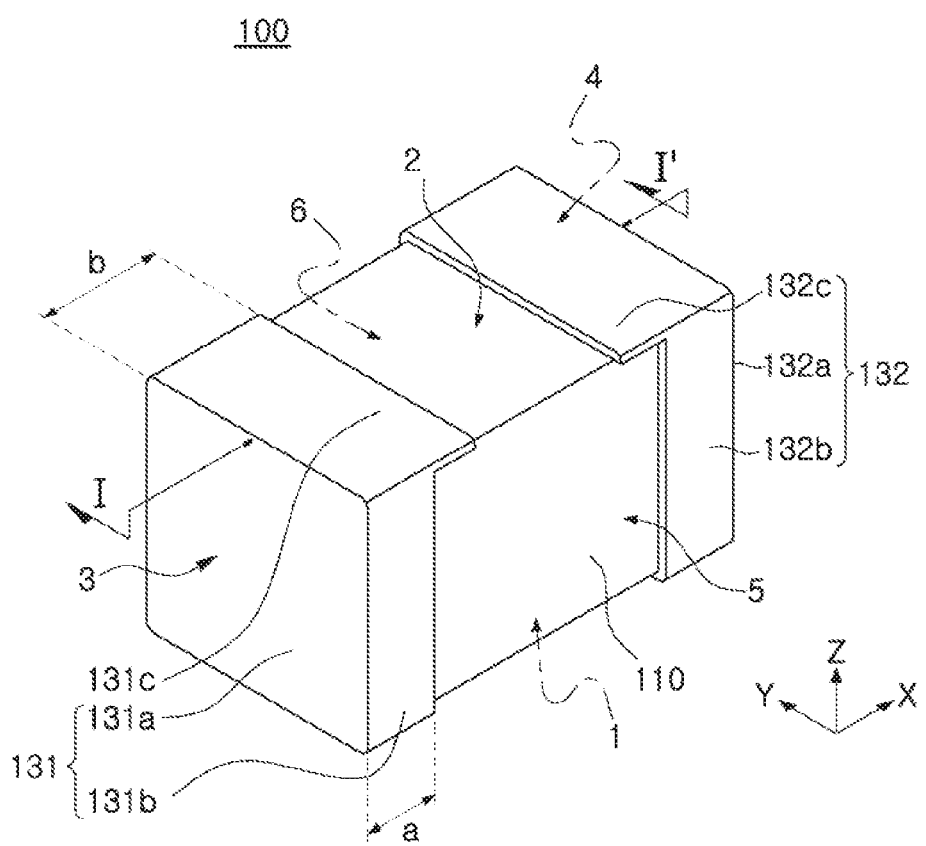
FIG. 1 is a perspective view of a multilayer capacitor applied to a first exemplary embodiment in the present disclosure.

Hereinafter, embodiments of the present disclosure will be described as follows with reference to the attached drawings. The present disclosure may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Through the specification, in addition, unless explicitly described to the contrary, the word "comprise" and variations such as "comprises" or "comprising," will be understood to imply the inclusion of stated elements but not the exclusion of any other elements.

Directions of a hexahedral ceramic body will be defined in order to clearly describe an embodiment of the invention. L, W and T shown throughout the drawings refer to a length direction, a width direction, and a thickness direction of a multilayer ceramic capacitor and an electronic component, respectively. Here, the Z direction may be the same as a direction in which dielectric layers are laminated.

Figure 2A:
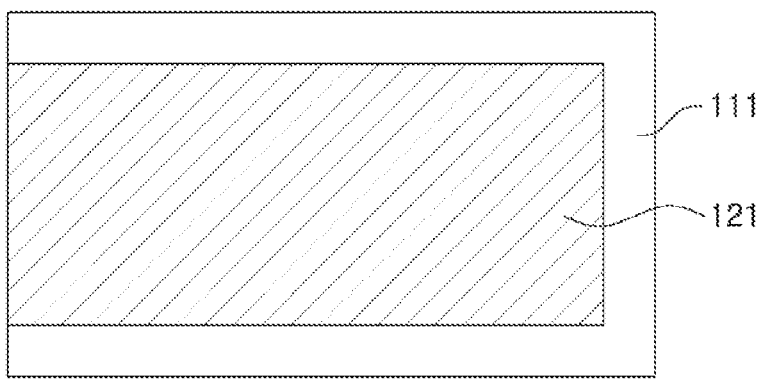
FIGS. 2A and 2B are plan views of first and second internal electrodes applied to the multilayer capacitor in FIG. 1, respectively.
Figure 2B:
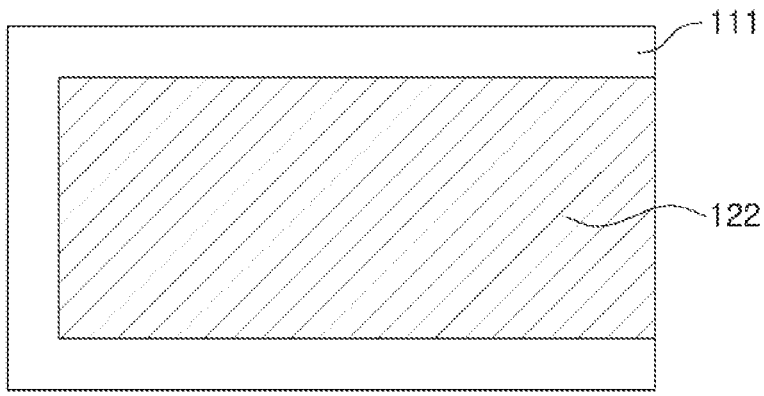

FIG. 1 is a perspective view of a multilayer capacitor applied to a first exemplary embodiment in the present disclosure. FIGS. 2A and 2B are plan views of first and second internal electrodes applied to the multilayer capacitor in FIG. 1, respectively, and FIG. 3 is a cross-sectional view taken along line I-I' in FIG. 1.

Hereinafter, a structure of a multilayer capacitor applied to an electronic component according to the present embodiment will be described with reference to FIGS. 1 to 3.

Figure 3:
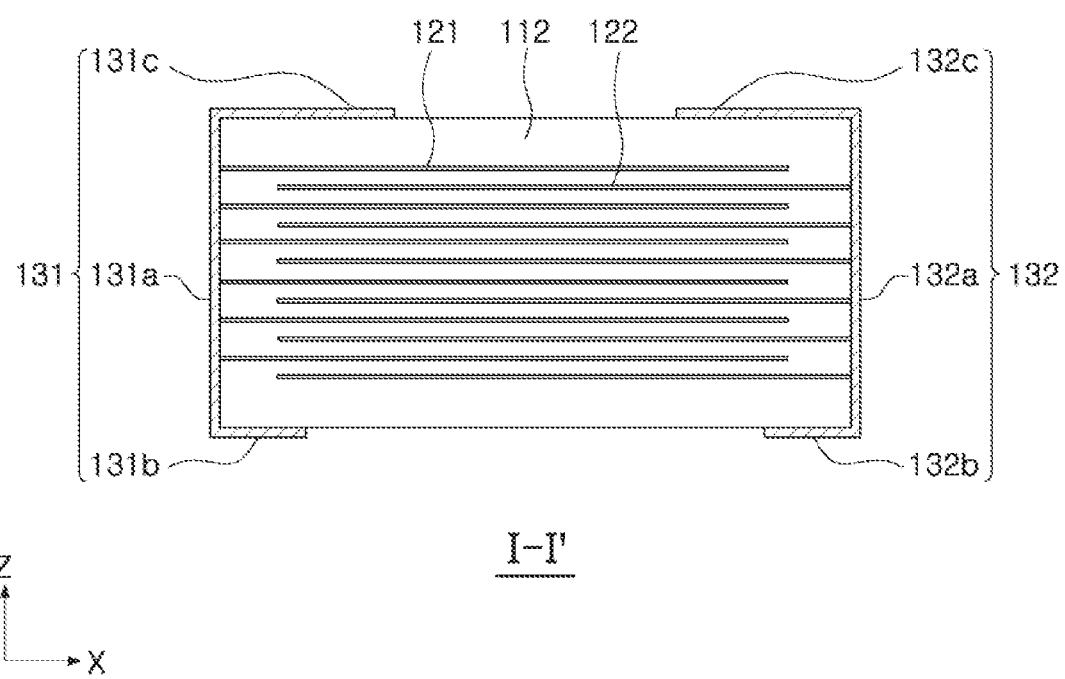
FIG. 3 is a cross-sectional view taken along line I-I' in FIG. 1.

Referring to FIGS. 1 to 3, a multilayer capacitor 100 according to the present embodiment includes a body 110 and first and second external electrodes 131 and 132 disposed on external surfaces of the body 110 in an X direction defined as a first direction, respectively.

The body 110 is formed by laminating a plurality of dielectric layers 111 in a Z direction and sintering the laminated dielectric layers 111. Adjacent dielectric layers 111 of the body 110 may be integrated with each other so that boundaries therebetween may not be readily apparent without using a scanning electron microscope (SEM).

The body 110 includes a plurality of dielectric layers 111 and first and second internal electrodes 121 and 122, having polarities different from each other, alternately disposed in the Z direction with each of the dielectric layers interposed therebetween.

The body 110 may include an active region as a portion contributing to formation of capacitance of a capacitor, and cover regions 112 and 113 as margin portions prepared in upper and lower portions of the body 110 in the Z direction.

The body 110 is not limited in shape, but may have a hexahedral shape. The body 110 may have first and second surfaces 1 and 2 disposed to oppose each other in the Z direction, third and fourth surfaces 3 and 4 connected to the first and second surfaces 1 and 2 and disposed to oppose each other in the X direction, and fifth and sixth surfaces 5 and 6 connected to the first and second surfaces 1 and 2 as well as the third and fourth surfaces 3 and 4 and disposed to oppose each other.

The dielectric layer 111 may include ceramic powder particles, for example, a barium titanate ($BaTiO_3$)-based ceramic powder particles or the like.

The $BaTiO_3$-based ceramic powder particles may be $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which calcium (Ca) or zirconium (Zr) is partially employed in $BaTiO_3$, but a material of the ceramic powder particles is not limited thereto.

In addition to the ceramic powder particles, a ceramic additive, an organic solvent, a plasticizer, a binder, and a dispersing agent may be further added to the dielectric layer 111.

The ceramic additive may include, for example, a transition metal oxide or a transition metal carbide, a rare earth element, magnesium (Mg), aluminum (Al), or the like.

The first and second internal electrodes 121 and 122, as electrodes applied with different polarities, may be disposed on the dielectric layer 111 to be laminated in the Z direction. The first and second internal electrodes 121 and 122 may be alternately disposed to oppose each other with a single dielectric layer 111 interposed therebetween inside the body 110 in the Z direction.

In this case, the first and second internal electrodes 121 and 122 may be electrically insulated from each other by the dielectric layer 111 disposed in the middle thereof.

While a structure in which internal electrodes are laminated in the Z direction has been described in the present disclosure, the present disclosure is not limited to the structure. If necessary, the present disclosure may be applied to a structure in which internal electrodes are laminated in the Y direction.

One ends of the first and second electrodes 121 and 122 may be exposed through the third and fourth surfaces 3 and 4 of the body 110, respectively.

End portions of the first and second electrodes 121 and 122 alternately exposed through the third and fourth surfaces 3 and 4 of the capacitor body 110 may be connected to the first and second external electrodes 131 and 132 disposed on both end portions of the body 110 in the X direction, which will be described later, to be electrically connected thereto, respectively.

According to the above-described configuration, charges are accumulated between the first and second internal electrodes 121 and 122 when a predetermined voltage is applied to the first and second external electrodes 131 and 132.

In this case, capacitance of the multilayer capacitor 100 may be proportional to an overlapping area between the first and second internal electrodes 121 and 122 overlapping each other in the active region in the z direction.

The first and second inner electrodes 121 and 122 may be formed using a conductive paste formed of at least one of a noble metal material such as platinum (Pt), palladium (Pd), and a palladium-silver (Pd—Ag) alloy, nickel (Ni), and copper (Cu).

The conductive paste may be printed by means of a screen printing method, a gravure printing method, or the like, but the printing method is not limited thereto.

The first and second external electrodes 131 and 132 may be provided with voltages having different polarities and may be disposed on both end portions of the body 110 in the X direction. The first and second external electrodes 131 and 132 may be connected to the exposed end portions of the first and second internal electrodes 121 and 122, respectively, to be electrically connected to each other.

The first external electrode 131 may include a first head portion 131a and a first band portion 131b.

The first band portion 131b is disposed on the third surface 3 of the body 110 and is in contact with an end exposed outwardly of the first internal electrode 121 through the third surface 3 of the body 110 to electrically connect the first internal electrode 121 to the first external electrode 131.

The first band portion 131b is a portion extending from the first head portion 131a to portions of the first, second, fifth, and sixth surfaces 1, 2, 5, and 6 of the body 110 to improve fixing strength or the like.

In this case, the first band 131*b* is disposed in such a manner that a portion disposed on at least one side of the body 110 has an area larger than an area of a portion disposed another side of the body 110.

In the present embodiment, the first band portion 131*b* is disposed in such a manner that an area of a portion disposed on the second surface 2 of the body 110 is larger than an area of a portion disposed on each of the first, fifth, and sixth surfaces 1, 5, and 6 of the body 110.

To this end, a portion of the first band portion 131*b* disposed on the second surface 2 of the body 110 may have a first extending portion 131*c*.

The second external electrode 132 may include a second head portion 132*a* and a second band portion 132*b*.

The second head portion 132*a* is disposed on the fourth surface 4 of the capacitor body 110 and is in contact with an end portion exposed outwardly of the second internal electrode 122 through the fourth surface 4 of the body 110 to physically and electrically connect the second internal electrode 122 to the second external electrode 132.

The second band portion 132*b* is a portion extending from the head portion 132*a* to portions of the first, second, fifth, and sixth surfaces 1, 2, 5, and 6 of the capacitor body 110 to improve fixing strength or the like.

In this case, the second band portion 132*b* is disposed in such a manner that a portion disposed on at least one side of the body 110 has an area larger than an area of a portion disposed another side of the body 110.

In the present embodiment, the first band portion 132*b* is disposed in such a manner that an area of a portion disposed on the second surface 2 of the body 110 is larger than an area of a portion disposed on each of the first, fifth, and sixth surfaces 1, 5, and 6 of the body 110.

To this end, a portion of the first band portion 132*b* disposed on the second surface 2 of the body 110 may have a second extending portion 132*c*.

The first and second external electrodes 131 and 132 may further include plating layers.

The plating layers may include first and second nickel (Ni) plating layers and first and second tin (Sn) plating layers covering the first and second nickel plating layers, respectively.

Figure 4:
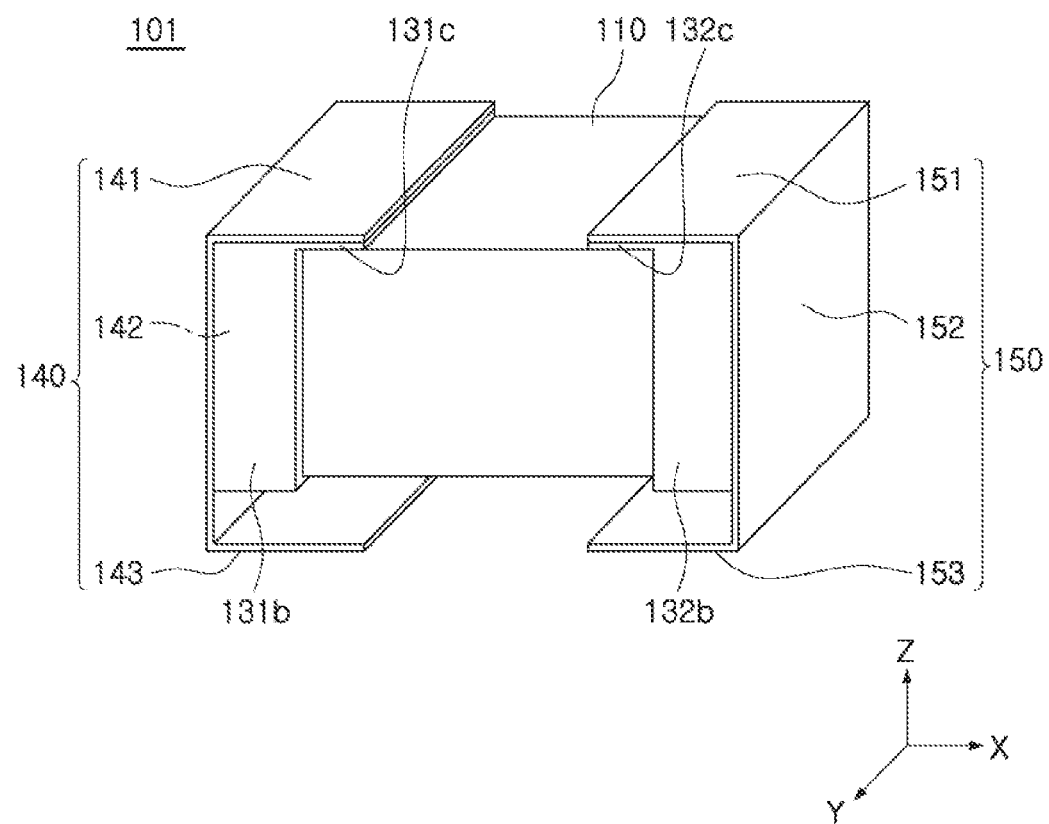
FIG. 4 is a perspective view illustrating that a metal frame is bonded to the multilayer capacitor in FIG. 1.
Figure 5:
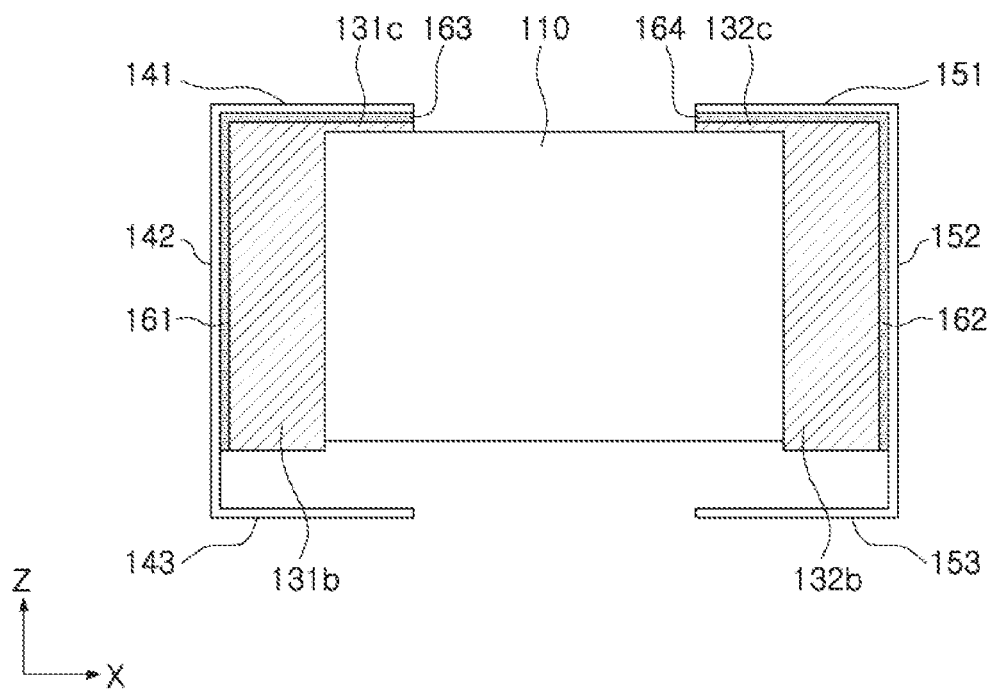
FIG. 5 is a front view of FIG. 4.

FIG. 4 is a perspective view illustrating that a metal frame is bonded to the multilayer capacitor in FIG. 1, and FIG. 5 is a front view of FIG. 4.

Referring to FIGS. 4 and 5, an electronic component 101 according to an exemplary embodiment includes a multilayer capacitor 100 and first and second metal frames 140 and 150 connected to first and second external electrodes 131 and 132 of the multilayer capacitor 100, respectively.

The first metal frame 140 includes a first support portion 142, a first mounting portion 143, and a first bonding portion 141.

The first support portion 142 is disposed perpendicular to a mounting surface. The first support portion 142 is bonded to a first head portion 131*a* of a first external electrode 131 and is electrically and physically connected to the first head portion 131*a* of the first external electrode 131.

In this case, a conductive adhesive portion 161 may be disposed between the first external electrode 131 and the first support portion 141.

The first conductive adhesive portion 161 may be formed of a high-temperature solder, a conductive adhesive, or the like, but a material thereof is not limited thereto.

The first mounting portion 143 extends from a lower end of the first support portion 142 in an X direction, which is a first direction, to be horizontal to the mounting surface and serves as a connection terminal during board mounting.

Also the first mounting portion 143 is disposed to be spaced apart from a bottom surface of the multilayer capacitor 100 by a predetermined distance in a Z direction.

The first bonding portion 141 is a portion extending from the first support portion 142 toward a surface on which a portion of the first band portion 131*b* formed to have a largest area is disposed.

In the present embodiment, since a first extending portion 131*c* of the first band portion 131*b* is disposed on a second surface 2 of a body 110, the first bonding portion 141 extends from an upper end of the first support portion 142 in the X direction to be bonded to the first extending portion 131*c*.

In this case, a third conductive adhesive portion 163 may be disposed between the first bonding portion 141 and the first extending portion 131*c*.

A second metal frame 150 includes a second support portion 152, a second mounting portion 153, and a second bonding portion 151.

The second support portion 152 is disposed perpendicular to the mounting surface and is bonded to a second head portion 132*a* of the second external electrode 132. The second support portion 152 is electrically and physically connected to the second head portion 132*a* of the second external electrode 132.

In this case, a second conductive adhesive portion 162 may be disposed between the second external electrode 132 and the second support portion 151.

The second conductive adhesive portion 162 may be formed of a high-temperature solder, a conductive adhesive, or the like, but a material thereof is not limited thereto.

The second mounting portion 153 extends from a lower end of the second support portion 152 in the X direction, which is the first direction, to be horizontal to the mounting surface and serves as a connection terminal during board mounting.

Also the second mounting portion 153 is disposed to be spaced apart from the bottom surface of the multilayer capacitor 100 by a predetermined distance in the Z direction.

The second bonding portion 151 is a portion extending from the second support portion 152 toward a surface on which a portion of the second band portion 132*b* formed to have a largest area is disposed.

In the present embodiment, since a second extending portion 132*c* of the second band portion 132*b* is disposed on the second surface 2 of the body 110, the second bonding portion 151 extends from an upper end of the second support portion 152 to be bonded to the second extending portion 132*c*.

A fourth conductive adhesive portion 164 may be disposed between the second bonding portion 151 and the second extending portion 132*c*.

In the case of a multilayer capacitor including a metal frame according to a related art, to improve bonding strength, a portion of a metal frame is bent to cover and hold the multilayer capacitor such that bonding strength is improved.

However, pressure may be applied to the multilayer capacitor while bending the portion of the metal frame. Thus, the multilayer capacitor may be damaged or cracking may occur in the multilayer capacitor. Moreover, even if the multilayer capacitor is inserted and bonded after the portion of the metal frame is bent in advance, a surface of the multilayer capacitor may be scratched to physically degrade reliability.

According to the present disclosure, an extending portion is disposed on a portion of an external electrode of a multilayer capacitor and a metal frame is disposed in such a manner that a bonding portion extends to only a portion in which the extending portion is disposed. Thus, the above disadvantages of the related art (for example, damage or cracking of a multilayer capacitor and scratches of a body surface of the multilayer capacitor, in a structure formed by bending a portion of a metal frame) may be addressed while improving bonding strength between the multilayer capacitor and the metal frame.

EXPERIMENTAL EXAMPLE

An experiment was performed to confirm improvement of bonding strength between an external electrode and a metal frame when a portion disposed on at least one surface, among four surfaces of a band portion of an external electrode disposed in a body, is larger than a portion disposed on another surface.

In the experiment, objects having loads of 200 mg and 400 mg were mounted on a second surface of a body of a multilayer capacitor to which a metal frame is bonded, respectively. A reflow process was performed three times at a temperature of 270 degrees Celsius to check separation of the metal frame from the multilayer capacitor and to enter the quantities of defects. The number of samples was five under each condition.

In Table (1), 'a' denotes a length of a band portion having a relatively small area in an X direction, and 'b' denotes a length of a band portion having a relatively large area in the X direction.

TABLE (1)

| | | b/a | | | | |
|---|---|---|---|---|---|---|
| | | 0 | 1 | 1.1 | 1.3 | 1.5 |
| Load Object | 200 mg | 1EA | 0EA | 0EA | 0EA | 0EA |
| | 400 mg | 3EA | 1EA | 0EA | 0EA | 0EA |

Referring to Table (1), b/a=0 is a case in which a metal frame does not include a bonding portion. In this case, separation of the metal frame from the multilayer capacitor occurred in both the load objects of 200 mg and 400 mg.

On the other hand, in a case in which the metal frame is bonded to the band portion of the external electrode (b/a≥1), separation of the metal frame form the multilayer capacitor was significantly reduced.

Similarly to the present disclosure, in a case in which a portion of a band portion of an external electrode includes an extending portion and a metal frame includes a support portion bonded to the extending portion (b/a>1), separation of the metal frame from the multilayer capacitor did not occur in both the load objects of 200 mg and 400 mg.

Accordingly, similarly to the present disclosure, it can be confirmed that in a case in which an external electrode of a multilayer capacitor includes an extending portion and a metal frame includes a support portion, bonding strength between the multilayer capacitor and the metal frame is improved.

Figure 6:
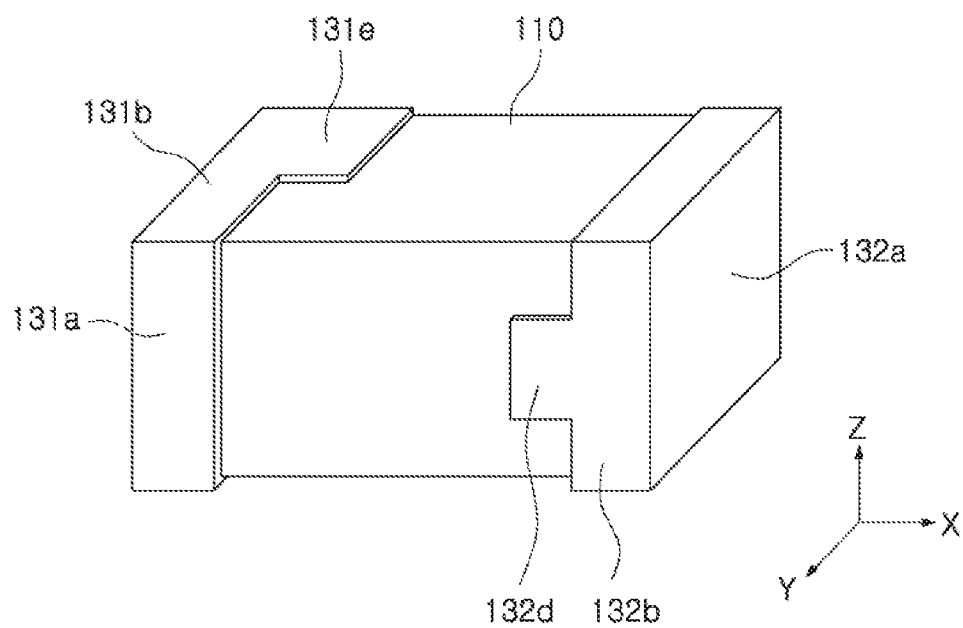
FIG. 6 is a perspective view of a multilayer capacitor applied to a second exemplary embodiment in the present disclosure.
Figure 7:
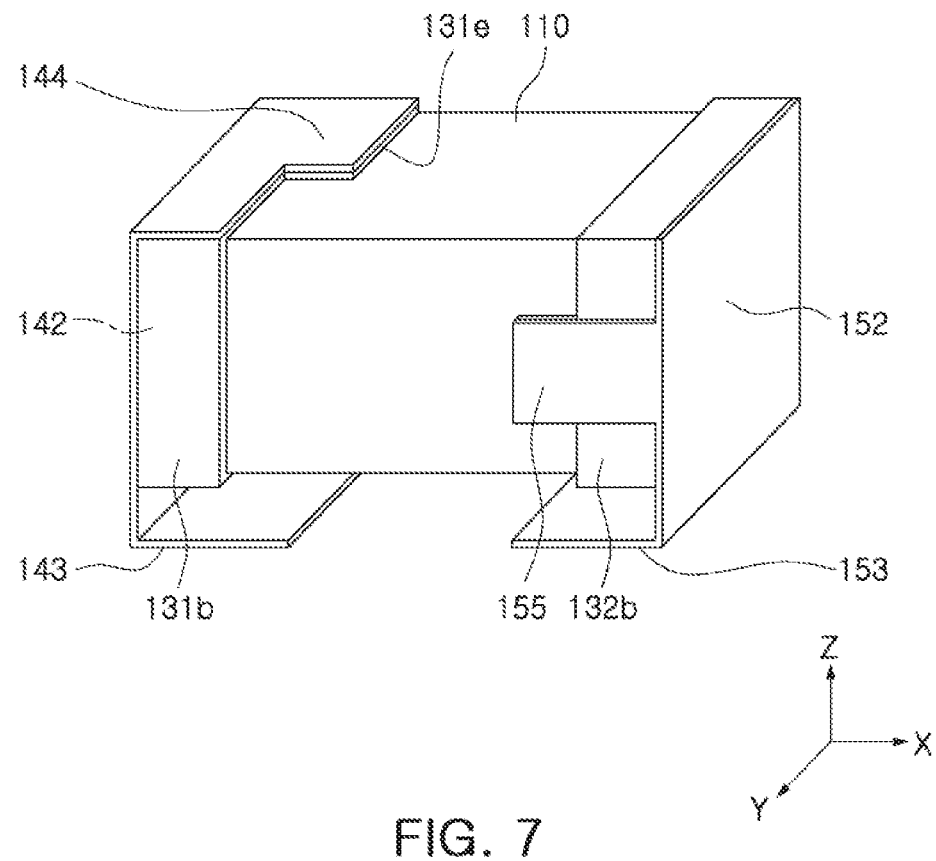
FIG. 7 is a perspective view illustrating that a metal frame is bonded to the multilayer capacitor in FIG. 6.

FIGS. 6 and 7 are perspective views illustrating a second exemplary embodiment in the present disclosure.

Since structures of a support portion and a mounting portion of a body of a multilayer capacitor and a metal frame are similar to those described in the first embodiment, detailed explanations thereof will be omitted to avoid duplicate explanations. An extending portion of an external electrode of a multilayer capacitor and a bonding portion of a metal frame, having structures different from those explained in the first embodiment, are shown and an electronic component will be described based on the shown structures.

Referring to FIGS. 6 and 7, in an electronic component according to the present embodiment, a first extending portion 131e of a first band portion 131b is disposed on a second surface 2 of a body 110 and a second extending portion 132d of a second band portion 132b is disposed on a fifth surface 5 of the body 110.

In this case, the first extending portion 131e is only disposed on a portion of the first band portion 131b such that about a half the first extending portion 131e from a corner, where the fifth surface 5 and the second surface 2 of the body 110 are connected, may be exposed without being covered with the first extending portion 131e, in a Y direction.

A first bonding portion 144 of a first metal frame 140 extend from an upper end of a first support portion 142 in an X direction to cover the first band portion 131b and the first extending portion 131e on the second surface 2 of the body 110.

A second bonding portion 155 of a second metal frame 150 extends in the X direction from a tip of a second support portion 152 in the Y direction to cover a second band portion 132b and a second extending portion 132d on the fifth surface 5 of the body 110.

Figure 8:
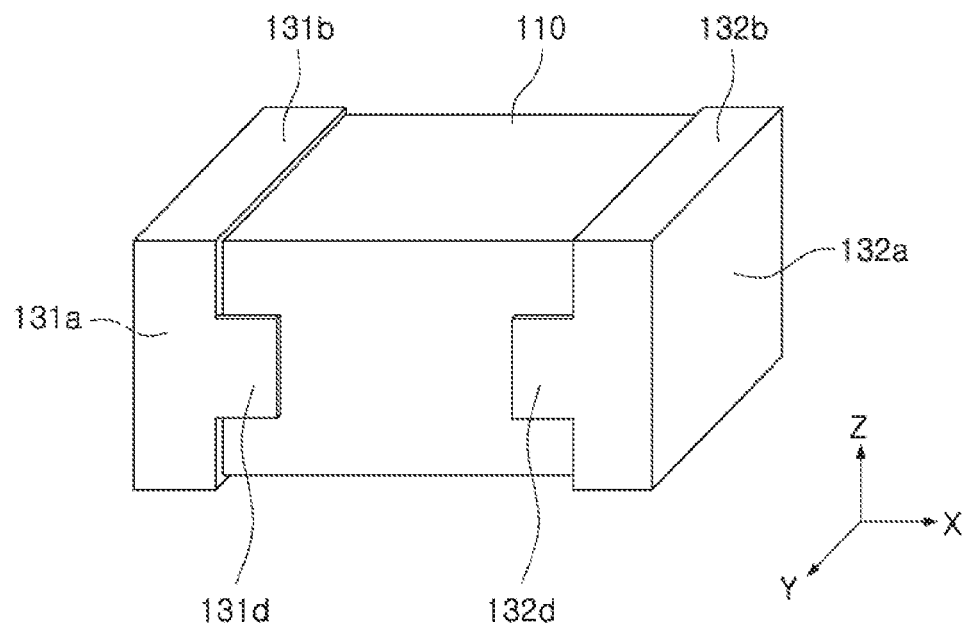
FIG. 8 is a perspective view of a multilayer capacitor applied to a third exemplary embodiment in the present disclosure.
Figure 9:
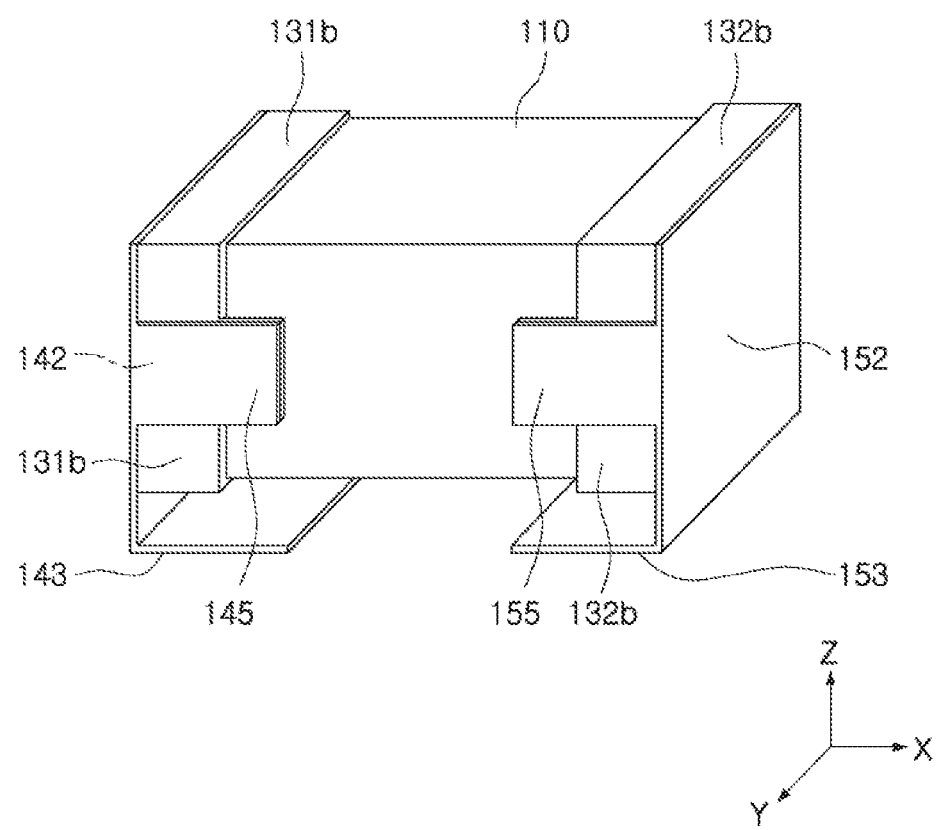
FIG. 9 is a perspective view illustrating that a metal frame is bonded to the multilayer capacitor in FIG. 8.

FIGS. 8 and 9 are perspective views illustrating a third exemplary embodiment in the present disclosure.

Since structures of a support portion and a mounting portion of a body of a multilayer capacitor and a metal frame are similar to those described in the first embodiment, detailed explanations thereof will be omitted to avoid duplicate explanations. An extending portion of an external electrode of a multilayer capacitor and a bonding portion of a metal frame, having structures different from those explained in the first embodiment, are shown and an electronic component will be described based on the shown structures.

Referring to FIGS. 8 and 9, in an electronic component according to the present embodiment, a first extending portion 131d of a first band portion 131b is disposed on a fifth surface 5 of a body 110 and a second extending portion 132b of a second band portion 132b is disposed on the fifth surface 5 of the body 110.

In this case, the first extending portion 131d is only disposed on a portion of the first band portion 131b, such that a portion of the first end portion 131d from both corners, in which the fifth surface 5 and first and second surface 1 and 2 of the body 110 are connected, may be exposed without being covered with the first extending portion 131d. A width of the first and second extending portions 131d and 132d may be less than a width of the ceramic body 110.

Additionally, the second extending portion 132d is only disposed on a portion of the second band portion 132b such that a portion of the first end portion 131d from both corners, in which the fifth surface 5 and first and second surface 1 and 2 of the body 110 are connected, may be exposed without being covered with the second extending portion 132d.

A first bonding portion 145 of a first metal frame 140 extends in the X direction from a tip of a first support portion 142 in the Y direction to cover a first band portion 131b and a first extending portion 131d on the fifth surface 5 of the body 110.

A second bonding portion 155 of a second metal frame 150 extends in the X direction from a tip of a second support portion 152 in the Y direction to cover a second band portion 132b and a second extending portion 132d on the fifth surface 5 of the body 110.

A width of the first and second bonding portions 145 and 155 may equal a width of the first and second extending portions 131d and 132d, respectively.

As described above, according to an exemplary embodiment, an extending portion is included in at least one surface of band portions of external electrodes disposed on four surfaces of a body and a metal frame is bonded to the extending portion. Thus, bonding strength between the external electrode and the metal frame and electrical and thermal conductivity may be improved while reducing an impact applied to a multilayer capacitor.

While exemplary embodiments have been shown and described above, it will be apparent to those skilled in the art that modifications and variations could be made without departing from the scope of the present invention as defined by the appended claims.

What is claimed is:

1. An electronic component comprising:
   a body having first and second surfaces opposing each other in a first direction, third and fourth surfaces opposing each other in a second direction, and fifth and sixth surfaces opposing each other in a third direction;
   first and second external electrodes including first and second head portions disposed on the first and second surfaces of the body, respectively, and first and second band portions extending from the first and second head portions to portions of the third, fourth, fifth and sixth surfaces of the body, respectively, wherein the first and second band portions respectively include first and second extending portions disposed on at least one surface of the body, such that a section of the band portion disposed on the at least one surface of the body has an area larger than an area of a section of the band portion disposed on another surface of the body; and
   first and second metal frames electrically connected to the first and second external electrodes, respectively,
   wherein the first and second metal frames respectively comprise:
      first and second support portions bonded to the first and second head portions, respectively;
      first and second mounting portions extending from ends of the first and second support portions in the first direction, respectively, and spaced apart from the first and second external electrodes, respectively; and
      first and second bonding portions respectively extending from the first and second support portions toward the at least one surface on which the first and second extending portions are disposed,
      wherein the first and second bonding portions are disposed on the first and second extending portions, respectively.

2. The electronic component of claim 1, wherein the body comprises:
   dielectric layers; and
   first and second internal electrodes alternately disposed with each of the dielectric layers interposed therebetween and having one ends exposed through both the surfaces of the body to be electrically connected to the first and second head portions, respectively.

3. The electronic component of claim 1, wherein first and second conductive adhesive portions are disposed between the first head portion and the first support portion and between the second head portion and the second support portion, respectively.

4. The electronic component of claim 1, wherein third and fourth conductive adhesive portions are disposed between the first band portion and the first bonding portion and between the second band portion and the second bonding portion, respectively.

5. The electronic component of claim 1, wherein the first and second extending portions are disposed on the same surface of the body.

6. The electronic component of claim 1, wherein the first and second extending portions are disposed on different surfaces of the body.

7. The electronic component of claim 1, wherein a width of the first and second extending portions is less than a width of the ceramic body.

8. The electronic component of claim 7, wherein a width of the first and second bonding portions equals a width of the first and second extending portions, respectively.

9. An electronic component comprising:
   a body;
   external electrodes including head portions disposed on external surfaces of the body, and band portions extending from the head portions to top and bottom surfaces and both side surfaces of the body, respectively, each of the band portions including an extending portion disposed on at least one surface of the body extending beyond a band portion disposed on another surface of the body; and
   metal frames electrically connected to the pair of external electrodes, respectively,
   wherein the metal frames each comprise:
   support portions bonded to the head portions;
   mounting portions extending from ends of the support portions in a first direction and spaced apart from the body and the external electrodes; and
   bonding portions extending from the support portions to be directly bonded to the extending portions.

10. The electronic component of claim 9, wherein the body comprises:
    dielectric layers; and
    a pair of internal electrodes alternately disposed with each of the dielectric layers interposed therebetween and having ends exposed through the surfaces of the body in the first direction to be connected to the head portions, respectively.

11. The electronic component of claim 9, wherein a conductive adhesive portion is respectively disposed between the head portions and the support portions.

12. The electronic component of claim 9, wherein a conductive adhesive portion is respectively disposed between the extending portions and the bonding portions.

13. An electronic component comprising:
    a body;
    external electrodes including head portions disposed on external surfaces of the body, and band portions extending from the head portions to top and bottom surfaces and both side surfaces of the body, respectively, each of the band portions including an extending portion disposed on at least one surface of the body extending beyond a band portion disposed on another surface of the body; and
    metal frames electrically connected to the pair of external electrodes, respectively, wherein the metal frames each comprise:

support portions bonded to the head portions;

mounting portions extending from ends of the support portions in a first direction and spaced apart from the body and the external electrodes; and bonding portions extending from the support portions to be disposed on the extending portions.

14. The electronic component of claim 1, wherein the first and second band portions and the respective first and second extending portions have a substantially same width.

15. The electronic component of claim 9, wherein the band portions and the respective extending portions have a substantially same width.

16. The electronic component of claim 13, wherein the band portions and the respective extending portions have a substantially same width.

\* \* \* \* \*